Figure 1:
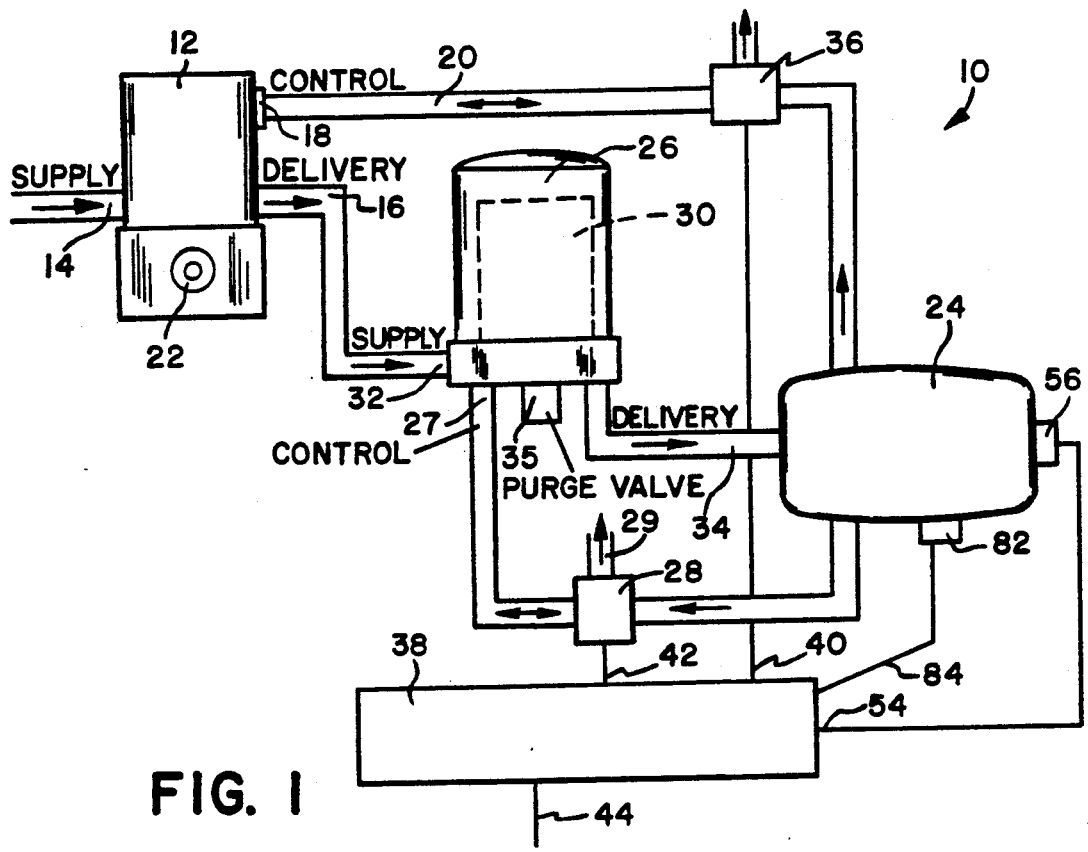

United States Patent [19]

Cramer et al.

[11] Patent Number: 5,103,576
[45] Date of Patent: Apr. 14, 1992

[54] CHARGE/PURGE CONTROL SYSTEM FOR AIR DRYER WITH HUMIDITY CONTROL

[75] Inventors: Kenneth L. Cramer, Jamestown, N.Y.; Robert D. Krieder, Sullivan, Ohio

[73] Assignee: Allied Signal Inc., Morristown, N.J.

[21] Appl. No.: 508,764

[22] Filed: Apr. 12, 1990

Related U.S. Application Data

[63] Continuation-in-part of Ser. No. 301,427, Jan. 26, 1989, Pat. No. 4,936,026.

[51] Int. Cl.$^5$ .............................................. F26B 19/00
[52] U.S. Cl. .......................................... 34/46; 34/80; 34/53
[58] Field of Search .................. 34/53, 80, 27, 33, 46; 303/85, 59, 60, 61; 55/213, 212

[56] References Cited

U.S. PATENT DOCUMENTS

| | | |
|---|---|---|
| 2,834,638 | 5/1958 | George . |
| 3,402,972 | 8/1966 | Cooper et al. . |
| 3,726,307 | 4/1973 | Carman et al. . |
| 4,083,608 | 4/1978 | Shirey . |
| 4,524,311 | 6/1985 | Yokota et al. . |
| 4,652,801 | 3/1987 | Burdett . |

FOREIGN PATENT DOCUMENTS

| | | |
|---|---|---|
| 93253 | 11/1983 | European Pat. Off. . |
| 191151 | 11/1985 | European Pat. Off. . |
| 199948 | 11/1986 | European Pat. Off. . |
| 249757 | 12/1987 | European Pat. Off. . |
| 303838 | 7/1988 | European Pat. Off. . |

*Primary Examiner*—Henry A. Bennet
*Assistant Examiner*—Denise L. F. Gromada
*Attorney, Agent, or Firm*—Ken C. Decker; William N. Antonis

[57] ABSTRACT

A compressed air system includes an electronic control which controls enabling and disabling of the compressor in response to pressure level variations in the system storage reservoir. A humidity sensor is installed in the system reservoir and generates a signal which varies as a function of the humidity of the compressed air in the reservoir. The control unit includes a comparator which compares the signal generated by the humidity sensor with a reference signal and generates a humidity control signal when the humidity of the air in the reservoir exceeds the reference level. The control unit responds to compressor disabling by causing the system air dryer to regenerate or purge for a predetermined time period, even if the compressor is unloaded for time periods greater than the predetermined time period.

17 Claims, 1 Drawing Sheet

CHARGE/PURGE CONTROL SYSTEM FOR AIR DRYER WITH HUMIDITY CONTROL

This application is a continuation-in-part of U.S. patent application Ser. No. 301,427, filed Jan. 26, 1989, now U.S. Pat. No. 4,936,026.

This invention relates to a system for controlling the charging and purging cycles of an air dryer used in a compressed air system.

Compressed air systems are used to operate many mechanical devices, and are particularly useful for operating braking systems for heavy vehicles and for operating industrial controls. These systems include an air compressor which compresses ambient air and charges a storage reservoir. In a compressed air braking system, the air compressor is operated by the engine of the vehicle. A governor is responsive to the pressure in the reservoir for unloading or disabling the compressor when the pressure level in the storage reservoir attains a predetermined pressure level, The governor enables or loads the compressor when the pressure in the reservoir drops to a predecided reference level. Some compressors used on automotive vehicles are powered through an electromagnetic clutch which is engaged and disengaged in response to the pressure level in the storage reservoir to thereby disable and enable the air compressor.

It has become common to provide compressed air systems with an air dryer, which drys the compressed air generated by the air compressor before it is communicated to the storage reservoir. These air dryers commonly provide a desiccant through which the air is communicated. A small quantity of air is segregated, and is used to regenerate or purge the desiccant when the compressor is disabled. However, existing systems use air dryers in which the desiccant is purged continually at all times while the compressor is unloaded or disabled. However, compressed air systems are used in a variety of applications having compressor loading cycles which vary widely. For example many such compressed air systems are used to operate the braking systems of large, line haul trucks, which are operated at highway speeds continually for hours at a time and the compressor on such vehicles may be unloaded or disabled for ninety percent or more of the time that the vehicle is operated. This means that the purge valve is opened almost continuously, thereby venting not only the desiccant to atmosphere, but also venting the line communicating the inlet of the air dryer with the outlet of the compressor. Since it is common to connect the inlet of the compressor with the outlet of the turbocharger so that the compressor is initially supplied with air at or above atmospheric pressure, the open purge control valve in the air dryer during regeneration of the desiccant provides a path for this compressor inlet air to be vented to atmosphere. This reduces the operating efficiency of the vehicle engine if the vehicle is equipped with a turbocharger or supercharger.

Such compressed air systems are also used to operate the brakes, doors, etc. of transit busses. These vehicles require large quantities of compressed air and the air compressors are unloaded infrequently. Since the air dryer can be purged only when the air dryer is unloaded or disabled, the air quality in systems with long charging cycles is diminished, with detrimental effects on the air activated appliances.

The present invention solves the problems inherent in the mechanical purge valve used on prior art air dryers by providing an electronic control which controls the charging and purging cycles of the air dryer. The system also includes a humidity control which continuously monitors the humidity of the compressed air stored in the reservoir. The humidity control initiates compressor unloading and desiccant purging to assure that the desiccant is purged often to assure quality air. An override is provided to prevent purging when the pressure level in the reservoir is dangerously low.

Figure 2:
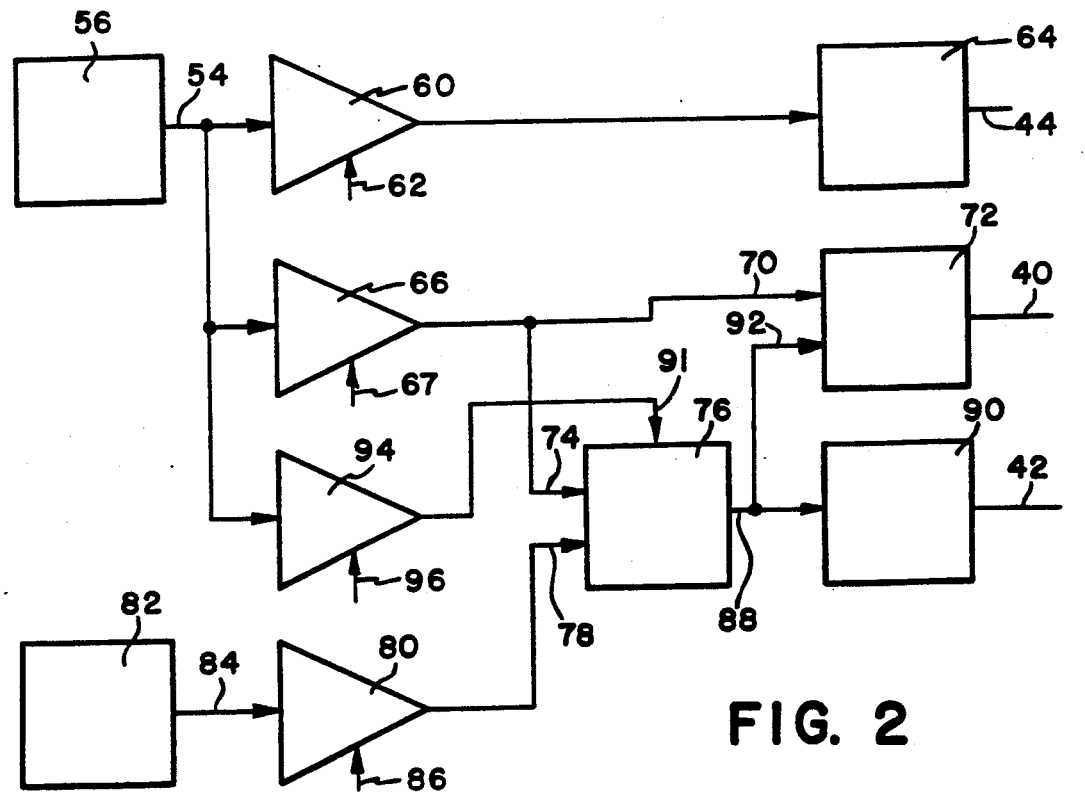

These and other advantages of the present invention will become apparent from the following description with reference to the accompanying drawings, in which:

FIG. 1 is a diagrammatic illustration of a compressed air system with an air dryer charge/purge control made pursuant to the teachings of the present convention; and FIG. 2 is a schematic illustration of the system of FIG. 1.

Referring now to the drawing, a compressed air system generally indicated by the numeral 10 includes a conventional automotive air compressor 12 having an inlet or supply 14, an outlet or delivery 16, and a conventional unloader 18 which unloads the compressor 12 during periods when compressed air is not needed. The unloader 18 responds to pressure signal communicated thereto through line 20 to load and unload the compressor 12. The compressor 12 is powered by the engine (not shown) of the vehicle through a drive pulley 22. Alternatively, the pulley may include an electromagnetic clutch mechanism of conventional design in lieu of the unloader 18. Accordingly, the compressor 12 is then disabled and enabled by engagement and disengagement of the electromagnetic clutch 22 instead of by the unloader 18. The inlet 14 may be communicated with ambient air through an air cleaner (not shown) or, if the engine operating the air compressor 12 is equipped with a turbocharger or supercharger, the inlet 14 may be communicated to the pressurized air at the outlet of these devices.

The outlet or delivery 16 of the air compressor 12 is communicated to a conventional storage reservoir 24 through an air dryer 26. The air dryer 26 includes a cannister of desiccant material 30 which is enclosed within the air dryer housing. An inlet or supply 32 communicates air into the air dryer 26, and an outlet or delivery 34 communicates air into a conduit communicating with the storage reservoir 24. A purge valve 35 communicates the air dryer 26 to atmosphere to purge the desiccant. The purge valve 35 is activated to purge the air dryer by a pressure signal communicated to control port 27.

A conventional solenoid valve 36 is installed in the line 20 which communicates the storage reservoir 24 with the control port of the unloader 18. Solenoid valve 36 is controlled by an electronic control unit 38. Electronic control unit 38 will be described in detail later herein with respect to FIG. 2. Electronic control unit 38 includes an output 40, which is connected to the solenoid valve 36, another output port 42, which is connected to a purge control valve 28, which is also solenoid actuated, and a third output port 44 which is connected to a warning device (not shown), which is mounted in the operator's compartment. The solenoid valve 28 is a conventional three-way solenoid valve which in its unactuated condition vents the control port 27 of air dryer 26 to atmosphere vent 29 and closes communication between valve 28 and the reservoir 24. However, when a signal is generated on output port 42, valve 28 is actuated so that the vent 29 is closed and communication is initiated between reservoir 24 and control port 27, thereby purging the air dryer 26. Electronic control unit 38 further includes an input terminal 54 which is connected to a conventional pressure sensor 56 which measures the pressure level in the storage reservoir 24 and generates a pressure signal which varies in accordance therewith.

Referring now to FIG. 2, the details of the electronic control unit will be described in detail. The signal from sensor 56, which is received on input terminal 54 is transmitted to low pressure warning comparator 60. Comparator 60 compares the output of sensor 56 with a predetermined reference value received at input 62 and generates an output signal when the value of the signal generated by sensor 56 drops below the threshold set at input 62. The output signal from comparator 60 actuates low pressure warning signal driver 64, which generates a signal on terminal 44 which actuates the low pressure warning indicator.

The output of sensor 56 is also transmitted to compressor unloading comparator 66, which compares the output of sensor 56 with a predetermined threshold value set on input 67. When the output of sensor amplifier 58 exceeds the threshold level set on 67, comparator 66 generates a pressure control signal which is transmitted to terminal 70 of a compressor unloader driver 72. Compressor unloader driver 72, in response to the pressure control signal on the terminal 70 thereof, generates a compressor control signal on the terminal 40, which is transmitted to the solenoid valve 36. Solenoid valve 36 responds to the compressor control signal to open communication between the reservoir 24 and the input port of the unloader 18, thereby transmitting a signal causing it to unload the compressor 12. In the alternate embodiment wherein the drive pulley 22 includes an electromagnetic clutch, the terminal 40 would be connected directly to the clutch to cause the clutch to disconnect the compressor 12 from driving engagement with the vehicle engine. When the pressure control signal is generated by comparator 66, the reference level at 67 is shifted to a predecided reference level which is lower than the predetermined pressure level in a manner well known to those skilled in the art. Accordingly, the pressure control signal is terminated when the pressure signal drops below the predecided pressure level.

The output of comparator 66 is also connected to input terminal 74 of an air dryer purge timer 76. Another input terminal 78 of air dryer purge timer 76 is connected to the output of a comparator 80. Comparator 80 compares a humidity signal generated by a humidity sensor 82 and transmitted to input terminal 84. Humidity sensor 82 is mounted in the air reservoir 24 and generates a humidity signal which varies as a function of the humidity of the air stored in the reservoir 24. Humidity sensor 82 is conventional and of the type well known to those skilled in the art. The comparator 80 compares the signal on terminal 84 with a predetermined reference level input 86. Reference level 86 represents a desired humidity level of the air within the reservoir 24 at which the moisture content of the air is sufficiently low that the moisture in the air will not have detrimental effect on the apparatus using the compressed air stored in reservoir 24. If the humidity signal on terminal 84 increases above the level set at reference level 86, comparator 80 generates a humidity control signal which is transmitted to the input terminal 78 of purge timer 76. Air dryer 76 responds to signals on either terminal 74 or 78 to generate a signal which is transmitted to air dryer purge driver 90. Air dryer purge driver 90 responds to the signal from terminal 88 to generate a signal on terminal 42 to operate the solenoid valve 28. The air dryer purge timer 76 generates the signal for a predetermined time period and extinguishes the signal on terminal 88 at the end of the predetermined time period. However, the air dryer purge time 76 responds to a signal on reset terminal 91 thereof to extinguish the signal on terminal 88 before the end of the predetermined time period. The signal on terminal 88 of air dryer purge timer 76 is also transmitted to terminal 92 of the compressor unloaded driver 72. The compressor unloader driver 72 responds to either the pressure control signal transmitted to terminal 70 or the purge control signal transmitted to terminal 92 to generate the compressor control signal on terminal 40.

Reset terminal 91 of the air dryer purge timer 76 is connected to the output of a reset pressure comparator 94. The input of comparator 94 is connected to the pressure signal on terminal 54 generated by the pressure sensor 56. Comparator 94 compares the pressure signal with a reset pressure limit on input 96. The reset pressure limit on input 96 represents a low pressure below which the pressure level in reservoir 24 should not be allowed to drop.

In operation, the low pressure warning driver 64 is operated by comparator 60 in response to a dangerously low pressure level in the reservoir 24 to warn the driver of a defect in the system. When the pressure level in the reservoir 24 increases to the predetermined pressure level on input terminal 67 of comparator 66, the air compressor must be disabled. Accordingly, comparator 66 generates the pressure control signal which is transmitted to terminal 70 of compressor unloader driver 72. Compressor unloaded driver 72 responds to the signal on terminal 70 to generate the compressor control signal on terminal 40, which actuates the valve 36 to unload or otherwise the air compressor 12 as discussed hereinabove.

The signal from comparator 66 is also transmitted to the terminal 74 of air dryer purge timer 76. Air dryer purge timer 76 responds to the signal on terminal 74 to generate the aforementioned signal on terminal 88 for a predetermined time period. This signal is transmitted to the air dryer purge driver 90, which generates the purge control signal on output terminal 42 which actuates the valve 28, as discussed hereinabove. The signal on terminal 88 is also transmitted to terminal 92 of the compressor unloader driver 72. If the pressure in reservoir 24 drops below the predecided reference level at which comparator 66 turns off the pressure control signal before the timer 76 times out, the enabling of the compressor is inhibited because the compressor unloader driver 72 responds to the signal on terminal 92 to maintain the compressor control signal on terminal 40 even in the absence of the signal on terminal 70. Accordingly, a complete regeneration of the air dryer is assured upon unloading of the compressor, unless the pressure level in the reservoir 24 drops to a dangerously low reset level established on terminal 96 of comparator 94. When the pressure level in the reservoir 24 drops below the reset pressure level on terminal 96, comparator 94 generates a signal transmitted to reset terminal 91 of the air dryer purge timer 76. Air dryer purge timer 76 responds to the signal on reset terminal 91 to reset the timer and thereby terminate the air dryer purge cycle before the timer 76 times out.

Even if the pressure level in the reservoir 24 remains below the predetermined pressure level so that the compressor control signal is not generated by the comparator 66, regeneration of the air dryer is nevertheless effected if the humidity level of the compressed air in reservoir 24 exceeds a predetermined set point set on terminal 86 of comparator 80. If the humidity sensor 82 generates a signal indicating a humidity level that exceeds that on the humidity set point 86, comparator 80 generates a humidity control signal which is transmitted to terminal 78 of timer 76. Since the timer 76 responds to signals on either the terminal 74 or the terminal 78, purge timer 76 initiates its timing cycle in response to the excess humidity level. Accordingly, a control signal is generated on terminal 88 which is transmitted both to the air dryer purge driver 90, which generates the purge control signal on terminal 42 operating the valve 28 to effect a purging of the desiccant, and to terminal 92 of compressor unloader driver 72, which generates the pressure control signal on terminal 40 operating the valve 36 to unload or disable the compressor 12. Compressor unloader driver 72 responds to the signal from timer 76 to unload or disable the compressor even if the pressure level in the air reservoir 24 is below the level at which comparator 66 generates the Pressure control signal. Accordingly, high quality air in the reservoir 24 is assured, as long as the pressure level remains above the reset pressure level set on input 96.

What is claimed is:

1. Compressed air system comprising an air compressor for compressing air, a storage reservoir for storing compressed air, said air compressor having a compressed air outlet connected to said storage reservoir and disabling means responsive to a compressor control signal for disabling said air compressor when the pressure level in the storage reservoir attains a predetermined pressure level and for again enabling said air compressor when the pressure level in the reservoir drops to a predecided pressure level, an air dryer connected between the compressed air outlet and said storage reservoir for removing entrained moisture in the compressed air communicated to said storage reservoir, said air dryer including a desiccant requiring periodic purging when said compressor is disabled, purge valve means responsive to a purging control signal for purging said desiccant, pressure sensing means for generating a pressure signal which varies as a function of the pressure level in the reservoir, means responsive to said pressure signal for generating a pressure control signal when the pressure level in the reservoir increases above said predetermined level and terminating said pressure control signal when the pressure level in the reservoir drops below the predecided pressure level, and timer means for generating a timer signal for a predetermined time period after generation of said pressure control signal, means for generating said purging control signal in response to said timer signal, and means for generating said compressor control signal in response to either said timer signal or said pressure control signal.

2. Compressed air system as claimed in claim 1, wherein said timer means includes means for receiving a reset signal, said timer means terminating said timer signal before the latter times out in response to said reset signal, and low pressure comparing means for comparing said pressure signal with a reset pressure reference signal representing a reset pressure level and generating said reset signal when the pressure signal drops below said reset pressure level.

3. Compressed air system as claimed in claim 2, wherein said system includes humidity responsive means for causing said purging control signal to be generated when the humidity of the compressed air communicated to the storage reservoir increases above said predetermined level.

4. Compressed air system as claimed in claim 3, wherein said humidity responsive means includes means included within the timer means for receiving a humidity control signal, said timer means being responsive to said humidity control signal to generate said timer signal.

5. Compressed air system as claimed in claim 4, wherein said humidity responsive means includes sensing means for sensing the humidity of the compressed air in said reservoir and generating said humidity control signal when the humidity of the compressed air in said reservoir exceeds a predetermined level.

6. Compressed air system as claimed in claim 1, wherein said system includes humidity responsive means for generating said purging control signal and said compressor control signal when the humidity of the compressed air in the system exceeds a predetermined level.

7. Compressed air system as claimed in claim 6, and means for inhibiting said purging control signal and the compressor control signal if the pressure level in the reservoir is below a reset pressure level.

8. Compressed air system as claimed in claim 6, wherein said humidity responsive means includes means within said timer means for receiving a signal generated by said humidity responsive means for causing said timer means to generate said timer signal.

9. Compressed air system as claimed in claim 6, wherein said humidity responsive means includes sensing means for generating a humidity signal which varies in accordance with the humidity level in the reservoir, means comparing said humidity signal with a reference value and generating a humidity control signal in response to the humidity signal representing a value which exceeds the value of humidity represented by the fixed reference signal, said timer means including means receiving said humidity control signal and causing said timer means to generate said timer signal in response thereto.

10. Compressed air system comprising an air compressor for compressing air, a storage reservoir for storing compressed air, said air compressor having a compressed air outlet connected to said storage reservoir and disabling means responsive to a compressor control signal for disabling said air compressor when the pressure level in the storage reservoir attains a predetermined pressure level and for again enabling said air compressor when the pressure level in the reservoir drops to a predecided pressure level, an air dryer connected between the compressed air outlet and said storage reservoir for removing entrained moisture in the compressed air communicated to said storage reservoir, said air dryer including a desiccant requiring periodic purging when said compressor is disabled, purge valve means responsive to a purging control signal for purging said desiccant, and humidity control means for sensing the humidity of the compressed air in said system and generating said purge control signal and said compressor control signal to unload said compressor and purge said air dryer when the humidity of the compressed air in the system exceeds a predetermined level.

11. Compressed air system as claimed in claim 10, wherein said system includes means for generating a reset signal when the pressure level in the reservoir drops below a predetermined reset pressure level, and means responsive to said reset signal for terminating said purge control signal and causing said compressor control signal to enable said compressor.

12. Compressed air system as claimed in claim 11, wherein said humidity control means includes sensing means for generating a humidity signal which varies as a function of the humidity level of the compressed air in the system, means for comparing said humidity signal with a signal representing a reference humidity value and generating a humidity control signal when the humidity signal indicates a humidity level exceeding the reference humidity value, and means responsive to the humidity control signal and the reset signal for generating the compressor control signal and the purge control signal unless the reset signal is generated.

13. Compressed air system as claimed in claim 10, wherein said humidity control means includes sensing means for generating a humidity signal which varies as a function of the humidity level of the compressed air in the system, means for comparing said humidity signal with a signal representing a reference humidity value and generating a humidity control signal when the humidity signal indicates a humidity level exceeding the reference humidity value, and means responsive to the humidity control signal for generating the compressor control signal and the purge control signal.

14. Compressed air system as claimed in claim 13, wherein said system includes means for terminating said compressor control signal and the purge control signal after generation of the latter in response to said humidity control signal after a predetermined time period.

15. Compressed air system as claimed in claim 13, wherein sensing means generating the humidity signal senses the humidity of the compressed air stored in said reservoir.

16. Compressed air system as claimed in claim 13, wherein said system includes pressure sensing means for sensing the pressure level in the reservoir and generating a pressure signal which varies in accordance with the pressure level in the reservoir, means responsive to said pressure signal for generating a pressure control signal when the pressure level in the reservoir exceeds a predetermined level, and means responsive to both said pressure control signal and the humidity control signal to generate said compressor control signal and the purge control signal in response to generation of either of said pressure control signal or said humidity control signal.

17. Compressed air system as claimed in claim 16, and means for limiting generation of the purge control signal to a predetermined time period in response to generation of either of said pressure control signal or said humidity control signal.

* * * * *